Sept. 18, 1962     H. E. STOVER     3,054,241
SEALING MACHINE AND METHOD
Filed Aug. 17, 1960     4 Sheets-Sheet 1
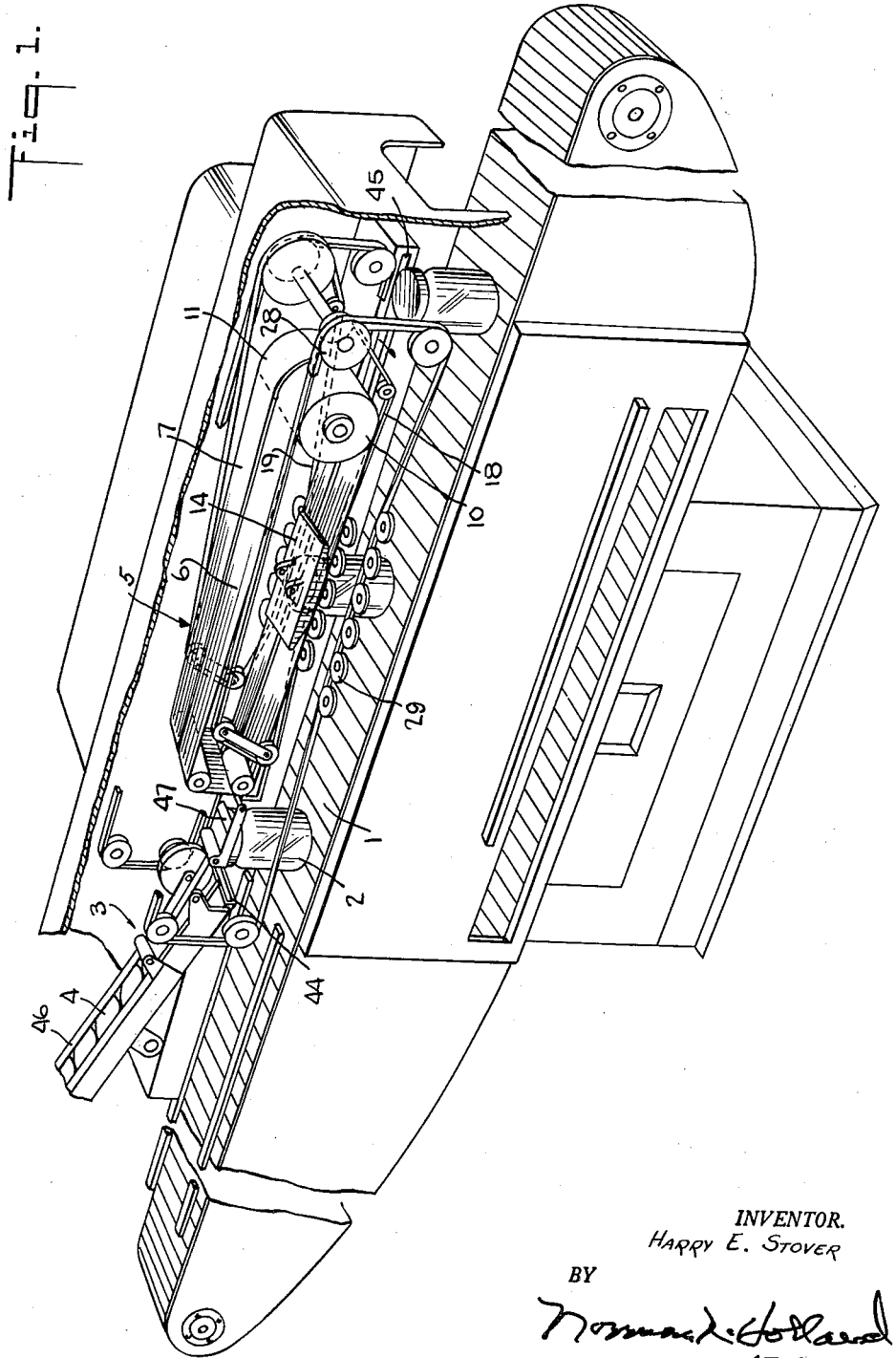
*INVENTOR.*
HARRY E. STOVER
BY
*ATTORNEY*

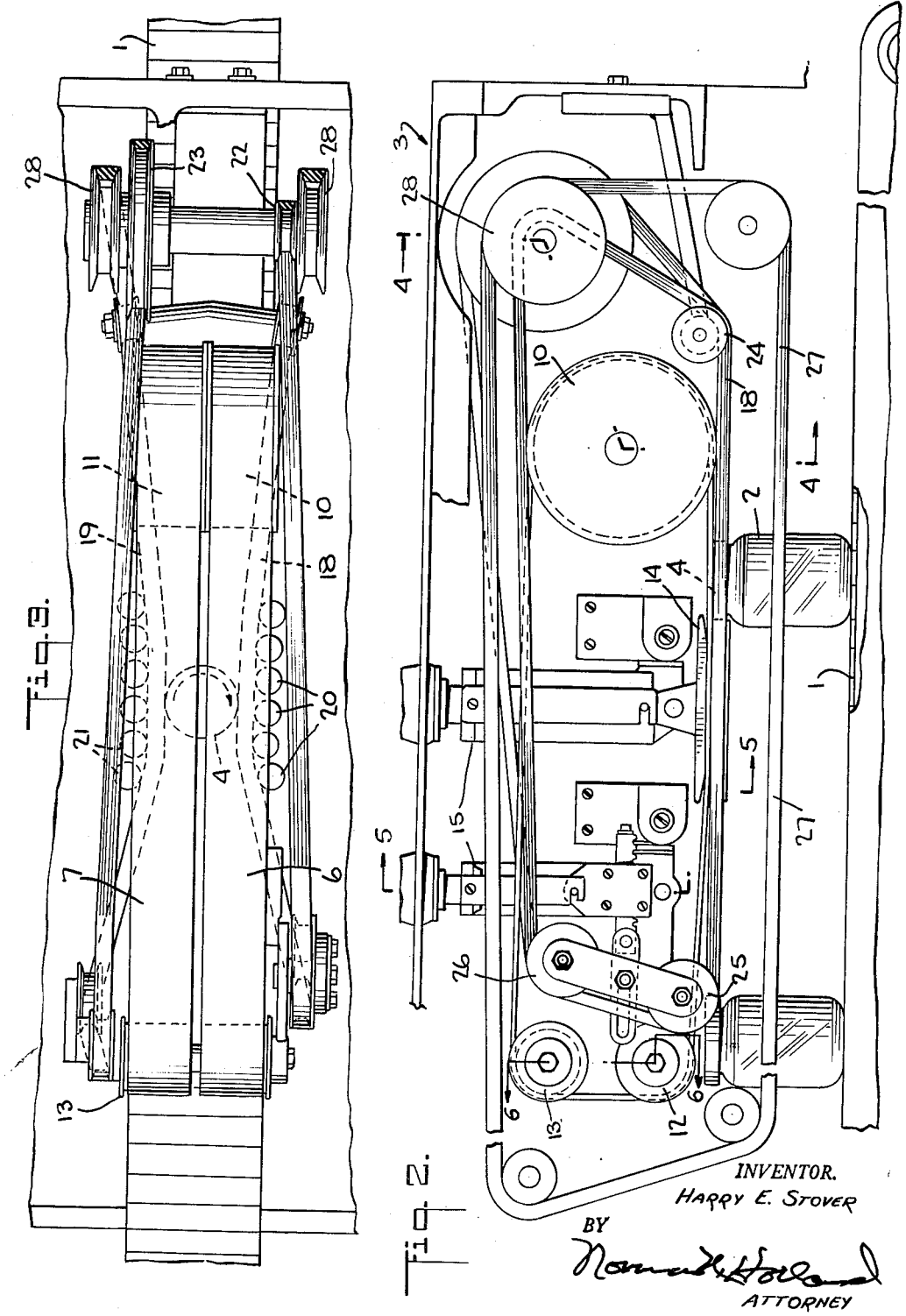

INVENTOR.
HARRY E. STOVER
BY
ATTORNEY

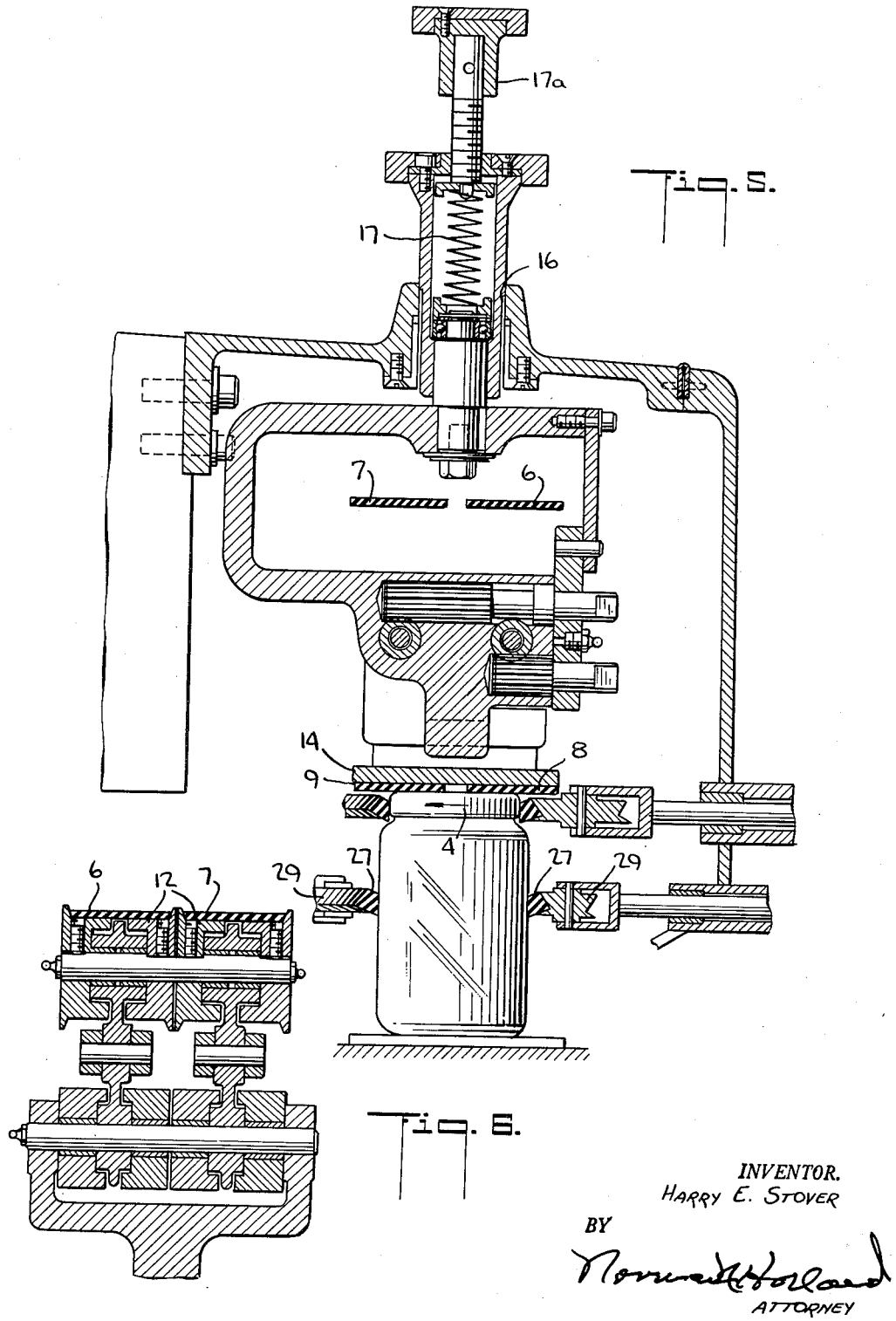

United States Patent Office 3,054,241
Patented Sept. 18, 1962

3,054,241
SEALING MACHINE AND METHOD
Harry E. Stover, Lancaster, Ohio, assignor to Anchor Hocking Glass Corporation, Lancaster, Ohio, a corporation of Delaware
Filed Aug. 17, 1960, Ser. No. 50,287
15 Claims. (Cl. 53—315)

The present invention relates to the sealing art and more particularly to a machine and method for sealing containers with screw caps.

The method and machine disclosed are of the type wherein filled containers are first moved beneath a cap applying means which loosely telescopes a cap over the container mouth and are then moved beneath a sealing head which presses the cap downwardly and rotates it into sealing relationship with the container. Such sealing machines are termed straight-line sealing machines where the containers are carried beneath the cap applier and sealing head on a straight-line conveyor and are termed rotary machines where the containers are moved beneath the cap appliers and the sealing heads along arcuate paths on rotating turrets or curved conveyors. The present improvement in such machines is especially adapted for use on straight-line sealing machines and the following description will be made in connection with a preferred embodiment of a straight-line sealing machine. It will be clear, however, that the improvement is not limited to straight-line machines as the improvement has broader applications.

A significant portion of the screw caps now being used have rubber, plastic, or other resilient gaskets which are used for forming a vacuum seal on food or other products. Such caps present a special sealing problem as they must be screwed down with a relatively great downward pressure to form a satisfactory vacuum seal. Many such caps are of the lug type and these caps are rotated only a fraction of a turn during this sealing operation.

Sealing machines presently used to apply screw-type caps utilize one or more positively driven members to engage either the container side walls or spaced portions of the screw caps and to provide relative rotation between the containers and caps to screw the caps into sealing position. Such machines, for example, utilize a pair of rotating wheels or a pair of driven belts which are positively coupled to a drive means so that the wheels or belts are driven at different speeds at a fixed speed ratio so that they impart a rotational movement to either the container or to the screw cap.

The present invention provides an improved machine for applying screw-type caps to containers by using two or more driven belts or wheels which turn the caps into their sealed position without themselves being subjected to excessive wear and without marring or otherwise damaging the closure caps.

Accordingly, an object of the present invention is to provide an improved machine and method for applying screw caps.

Another object of the present invention is to provide a sealing machine and method adapted for the efficient application of screw caps with a minimum amount of wear to the sealing machine.

Another object of the present invention is to provide a sealing machine and method for sealing containers with screw caps without scratching or otherwise damaging the caps.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of the sealing machine in accordance with the present invention;

FIG. 2 is a side elevational view partially cut away of the sealing head of the sealing machine of FIG. 1;

FIG. 3 is a top plan view of the sealing head of FIG. 2;

FIG. 5 is a sectional view of the sealing machine taken along line 5—5 of FIG. 2; and, FIG. 6 is a sectional view of the sealing machine taken along line 6—6 of FIG. 2.

Figure 4:
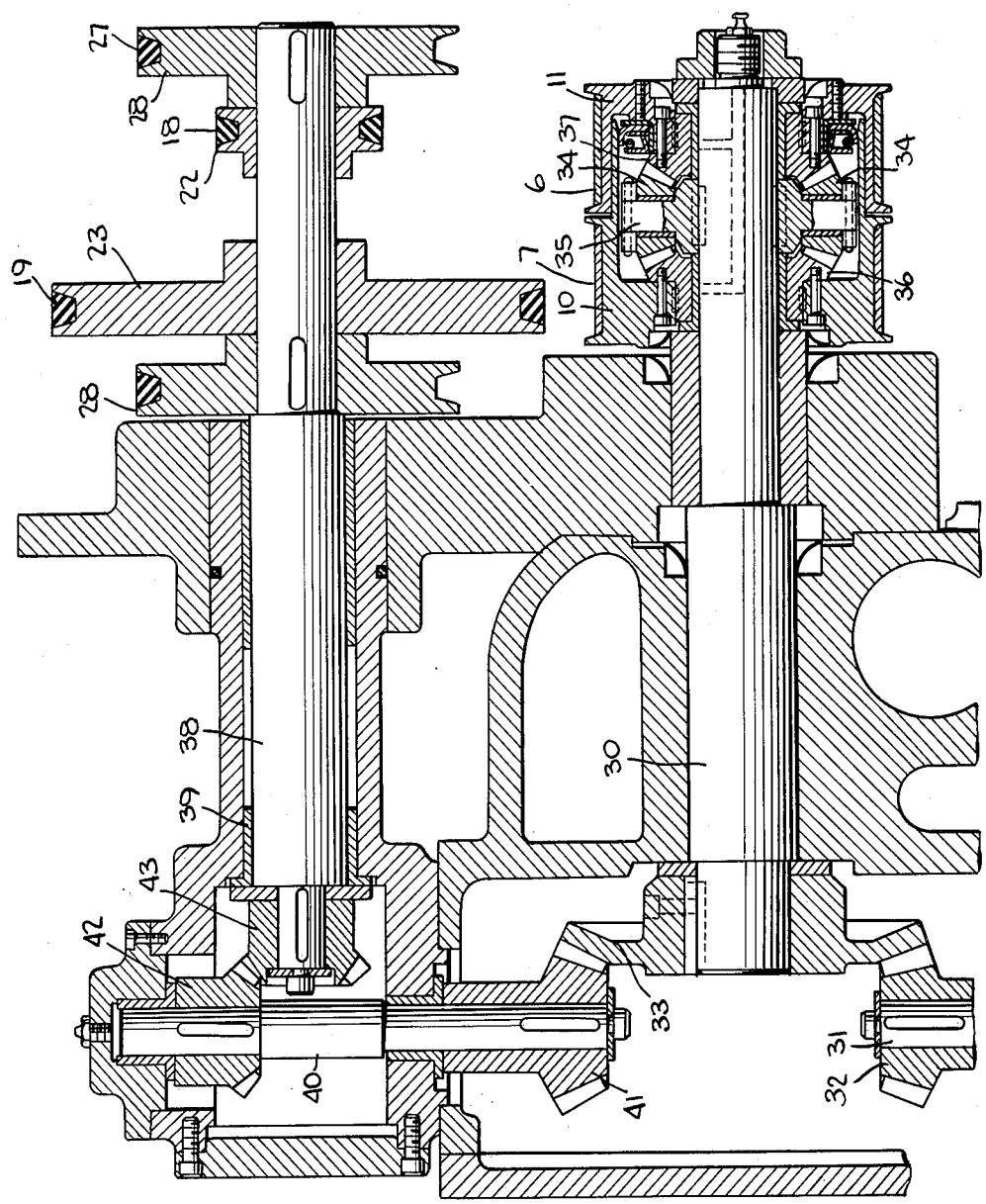
FIG. 4 is an enlarged cross-sectional view of the sealing machine taken along line 4—4 of FIG. 2.

The preferred embodiment of the sealing machine illustrated in the drawings will now be described in detail.

As illustrated in FIG. 1, the sealing machine has a conveyor 1 mounted on a suitable base. The conveyor 1 carries a line of containers 2 beneath a cap applicator 3 which loosely applies a cap 4 to the top of each container 2. A suitable cap applicator is shown for example in my copending application Serial No. 6,993, filed February 5, 1960. The conveyor 1 next carries the containers 2 beneath a sealing head 5 which presses and rotates each cap 4 into sealing position on the container 2. A suitable drive motor is mounted in the base to drive conveyor 1 and sealing head 5.

As seen in FIGS. 2 and 3, containers 2 are continuously moved towards the sealing head 5 on the conveyor 1 with a cap 4 loosely telescoped over the top of each container 2 in position to be rotated and pressed downwardly into sealing position.

Each of the containers 2 is moved beneath a pair of pressure belts 6 and 7 having relatively flat lower runs 8 and 9 which engage spaced portions of the tops of caps 4.

As illustrated in FIG. 2 each of the endless belts 6 and 7 are mounted at one end on the drive pulleys 10 and 11, respectively, and at the opposite end on the tensioning pulleys 12 and 13. The lower runs 8 and 9 of the pressure belts 6 and 7 pass beneath a pressure shoe 14 which is adjustably connected to the top of the sealing machine frame on the mounting brackets 15. The vertical position of the shoe 14 is adjusted by means of the threaded coupling 16 (FIG. 6) and spring 17 is compressed by adjusting screw 17a to provide the desired degree of downward pressure on each cap 4 by pressure belts 6 and 7 as the cap 4 is carried beneath the shoe 14 by the combined movement of conveyor 1 and the pressure belts 6 and 7.

The pressure belts 6 and 7 are driven by means of drive pulleys 10 and 11 through a gear coupling which will be further described below. This gear coupling drives the lower runs 8 and 9 of pressure belts 6 and 7 at the same speed as the conveyor 1 when the pressure belts are not in contact with a cap 4. When, however, pressure belts 6 and 7 engage spaced portions of a cap 4 the rotation of the cap will put an unequal load on the two pressure belts 6 and 7 so that the speed of the pressure belts changes to follow the rotational movement of the particular portions of the caps 4 with which they are in contact. This will speed up belt 7 and slow down belt 6 so that the pressure belts 6 and 7 follow the rotational movement of the caps 4. The downward pressure of the belts 6 and 7 on the cap 4 as it rests on the container threads provides one rotational force which tends to rotate the caps 4 downwardly on the container threads. In the preferred embodiment an auxiliary cap rotating means is also used to rotate each cap 4 on the container threads. As illustrated in FIGS. 2 and 3 this auxiliary cap rotating means comprises cap rotating belts 18 and 19. These two cap rotating belts 18 and 19 are mounted on opposite sides of the moving containers 2 and they are positioned inwardly in engagement with the sides of each closure cap 4 as illustrated in FIG. 3 by suitably adjustable side pulleys 20 and 21. The cap rotating belts 18 and 19 are driven by drive pulleys 22 and 23, respectively, at different speeds so that the belt 18 (FIG. 3) is moving slower than the conveyor 1 and so that the cap rotating belt 19 is moving faster than the conveyor 1. When the cap 4 is moved into engagement with these two belts, therefore, their combined motion rotates the cap in such a direction so as to apply it to the container threads. The cap rotating belts 18 and 19 are further positioned and kept at the desired degree of tension by adjustable idler pulleys 24, 25, and 26.

In order to retain each of the containers 2 in an erect position and in order to move the containers 2 at the conveyor speed beneath the shoe 14 during the sealing operation it is preferable to have a pair of side belts 27 which are driven by suitable drive pulleys 28 at the same speed as the conveyor 1. These belts are held in contact with the containers 2 as they pass beneath the friction shoe 14 by side pulleys 29.

As illustrated in FIG. 4 the drive pulleys 10 and 11 for the pressure belts 6 and 7, respectively, are mounted on a horizontal drive shaft 30 positioned in the upper portion of the machine frame. Shaft 30 is driven by the sealing machine drive motor (not shown) through the intermediation of shaft 31 and bevel gears 32 and 33. Shaft 30 is rotated at a speed which causes the drive pulleys 10 and 11 to move the pressure belts 6 and 7 at the same speed as the conveyor 1 when there is no cap in contact with pressure belts 6 and 7. When, however, a cap moves beneath the shoe 14 and simultaneously comes in contact with cap rotating side belts 18 and 19, pressure belt 7 will speed up to move at a greater speed than that of the conveyor due to its contact with an off-center portion of the rotating top of cap 4 and pressure belt 6 will slow down due to its contact with an opposite off-center portion of cap 4. This adjustment of the speed of the pressure belts 6 and 7 to accommodate their speed to the general rate of rotation of the opposite sides of the spinning cap is provided by the gear coupling between shaft 30 and the drive pulleys 10 and 11. This coupling includes two pinion drive gears 34 mounted on a spider 35 rigidly coupled to the rotating shaft 30. The pinion gears 34 are coupled to each of the drive gears 10 and 11 by bevel gears 36 and 37. When the two drive pulleys 10 and 11 are subjected to equal loads they turn at the same rate as shaft 30 but when they are subjected to unequal loads there is an increase in the speed of one pulley accompanied by an equal decrease in the speed of the other pulley. Thus, the pressure belts 6 and 7 which are applying a relatively large downward force to the caps 4 will simultaneously have different speeds resulting from the rotational movement applied to the belts by the rotating cap 4.

Since the final rate of speed of each of the pressure belts 6 and 7 is obtained from their contact with the rotating caps 4, the speed of each pressure belt will tend to correspond to that portion of the closure 4 being subjected to the greatest downward pressure by each pressure belt. This is the portion of the cap 4 which causes the most wear on the pressure belts and also the point where the most damage is liable to be caused to the cap finish. Thus, the wear and damage are minimized by the drive system since the pressure belts and the critical portions of the closure caps will be moving at the same speed. This has been found to provide a distinct improvement in belt life and a reduction in cap damage. Since the relatively wide pressure belts 6 and 7 cover correspondingly wide portions of the cap all portions of the belts cannot move at the same speeds as their corresponding cap contact areas. The driven pressure belts 6 and 7, however, will automatically adjust themselves to move at the speed of the cap portion which is under the greatest pressure and the remaining portions where slippage must occur will be less tightly pressed portions where the wear and damage due from slippage is less significant. The driven pressure belts 6 and 7 will also tend to follow the actual rotation of the caps 4 so that slippage will be eliminated or minimized between the belts and the closure caps.

Although the drive pulleys 22 and 23 for the cap rotating belts 18 and 19 and the drive pulleys 28 for the side belts 27 may be mounted on the same drive shaft 30 as the pulleys 10 and 11, in the preferred embodiment these pulleys are mounted on a separate drive shaft 38 (FIG. 4) which permits a more advantageous positioning of the cap rotating belts and the side belts. The drive shaft 38 is mounted in the sealing machine frame on suitable bearings 39 and is driven from the pinion 33 on the drive shaft 30 through the intermediation of connecting shaft 40 and gears 41, 42 and 43.

In order to form a vacuum seal for the containers 2 a suitable vapor outlet 44 is located adjacent to the cap applicator 3. This outlet operates in the usual manner for such a sealing machine by filling the container headspaces with steam or another condensable vapor. Where it is desired to control the degree of vacuum the container headspaces are filled with a predetermined mixture of a condensable vapor and a non-condensable gas or air. After the caps 4 have been applied, a cooling of the vapor within the sealed headspace condenses it and causes a headspace vacuum. An elongated steam distributing tunnel as illustrated at 45 is also positioned adjacent to the lower run of the pressure belts 6 and 7 to maintain a steam atmosphere adjacent to the caps 4 during the final sealing action to insure the maintenance of a vacuum within the container headspace and to prevent the re-entry of any air into the headspace while the seal is being completed.

In the operation of the machine, containers 2 are continuously fed to the moving conveyor 1 in spaced relationship. The spaced containers 2 are carried by the conveyor 1 beneath an inclined cap shute 46 of the cap applicator 3. The lowermost cap 4 in the cap shute 46 has its forward edge positioned to engage the corresponding top edge of a moving container 2 so that the cap 4 is drawn out of the chute 46 and into telescoping relationship with the container top. The cap 4 is next preferably moved beneath a leveling plate 47 which is resiliently mounted on the end of the cap applicator 3 and which levels each cap 4 on the container top to prepare the cap 4 for the final sealing rotation which is performed by the sealing head 5. When a vacuum seal is desired the nozzle 44 at the bottom of the cap applicator 3 injects steam or another condensable vapor or a mixture of a condensable vapor and an inert gas into the headspace of the container 2 prior to and during the application of the cap 4.

After the closures 4 are applied to the tops of the containers 2 further movement of the conveyor 1 carries each container 2 to the sealing head 5. As each container 2 passes beneath the sealing head 5, conveyor 1 and the moving side belts 27 draw the container 2 beneath the lower runs of a pair of pressure belts 6 and 7 and a pair of cap rotating belts 18 and 19. The cap rotating belts 18 and 19 are being driven by suitable drive pulleys which cause the cap rotating belt 18 to move slower than the conveyor 1 and the cap rotating belt 19 to move faster than the conveyor 1. The cap rotating belts 18 and 19 which are held in engagement with the sides of the closure 4 therefore rotate the closure 4 downwardly on the container threads.

Simultaneously, resiliently mounted pressure shoe 14 forces pressure belts 6 and 7 downwardly against spaced portions of the closure 4. Pressure belts 6 and 7 are being driven through the geared coupling 34–37 which drives the two belts 6 and 7 at the conveyor speed when they are out of contact with the closure cap and which causes an accommodating speed change in the motion of the belts when they are subjected to unequal loads such as results from the rotation of the closure 4. Thus, the pressure belt 6 which is contacting the lower portion (FIG. 3) of the closure 4 is slowed down to follow the general speed of this portion of the closure. The opposite portion of the closure 4 which is in contact with the pressure belt 7 speeds up the pressure belt 7 by a corresponding amount. The drive coupling for the pressure belts 6 and 7, therefore, compensates for the difference in speed caused by the rotation of the cap 4 with relation to the moving pressure belts 6 and 7. The pressure belts 6 and 7, provide for a substantial downward sealing pressure on each closure 4 and a simultaneous rotational movement of the closure 4 which causes it to be threaded onto the threads of the container and into sealing relationship with the container sealing finish.

It will be seen that an improved sealing machine has been disclosed for screw-type closure caps. Previous machines which applied screw caps with downward pressure have been subjected to excess wear particularly at the sealing belts and these previous machines have also scratched or otherwise damaged the closure caps. The present machine provides for a great reduction in machine part wear and also applies screw caps without scratching or otherwise damaging them.

These improvements in the present machine have been achieved by a novel sealing method and machine which is itself relatively simple and rugged and which is also extremely versatile so that it may be readily adjusted for use with a wide variety of container and cap sizes and shapes. The machine of the present invention also may be operated at high speeds while forming vacuum seals so that the machine is applicable for use in high speed food packaging lines where the utmost reliability is required in the vacuum seals.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A sealing machine for sealing containers with screw caps comprising the combination of a container conveyor, a cap applying means, a pair of driven sealing members mounted above said conveyor and positioned to engage caps on the containers being carried by said conveyors, and to press them downwardly, and means for interconnecting said sealing members to permit continuously compensating relative movement one with respect to the other.

2. A sealing machine for sealing containers with screw caps comprising the combination of a container conveyor, a cap applying means positioned to apply caps to containers on said conveyor, means to rotate the caps on the containers, a pair of sealing belts mounted above said conveyor having a lower run positioned to engage spaced portions of the caps on the containers, and means for interconnecting said sealing belts causing continuously compensating relative speed adjustment of one belt with respect to the other.

3. A sealing machine for sealing containers with screw caps comprising the combination of a container moving conveyor, a cap applying means positioned to apply caps to containers on said conveyor, means to rotate caps on containers, a pair of sealing belts mounted above said conveyor and positioned to engage spaced portions of the caps on the containers, driving means for said sealing belts, and a coupling between said driving means and said sealing belts for driving both belts at the conveyor speed when said belts are not engaging closure caps and causing one belt to move faster and one belt to move slower when said belts engage rotating caps on the containers.

4. A sealing machine for sealing containers with screw caps comprising the combination of a container moving conveyor, a cap applying means positioned to apply caps to containers on said conveyor, means to rotate caps on the containers, a pair of sealing pressure belts mounted above said conveyor and positioned to engage spaced portions of the caps on the containers, driving means for said sealing pressure belts, a coupling between said driving means and said sealing belts for driving both belts at the conveyor speed when said belts are not engaging closure caps and causing one belt to move faster and one belt to move slower when said belts engage a rotating cap, and a pressure shoe resiliently mounted adjacent said sealing pressure belts and urging each of said sealing pressure belts downwardly against the container tops.

5. A sealing machine for sealing containers with screw caps comprising the combination of a conveyor for moving threaded containers, a cap applying means to apply caps to said moving containers, a pair of cap rotating means positioned to engage spaced portions of the caps on the containers, driving means for each of said cap rotating means for driving one faster than said conveyor and the other slower than said conveyor to rotate the caps onto the threads of the containers, a pair of pressure members mounted above said conveyor and positioned to engage other spaced moving portions of the caps on the containers, and means for interconnecting said pressure members and causing a continuous relative speed adjustment of one pressure member with respect to the other.

6. A sealing machine for sealing containers with screw caps comprising the combination of a conveyor for moving threaded containers, a cap applying means to apply caps to said moving containers, a pair of cap rotating belts positioned to engage spaced portions of the caps on the containers, driving means for each of said cap rotating belts for driving one faster than said conveyor and the other slower than said conveyor to rotate the caps onto the threads of the containers, a pair of pressure belts mounted above said conveyor and positioned to engage other spaced portions of the caps on the containers, and a coupling adapted to couple each of said pressure belts to a driving means to cause the speed of each of said pressure belts to be changed by the speed of rotation of the cap engaged thereby.

7. A sealing machine for sealing containers with screw caps comprising the combination of a conveyor for moving threaded containers, a cap applying means to apply caps to said moving containers, a pair of cap rotating belts positioned to engage spaced portions of the caps on the containers, driving means for each of said cap rotating belts for driving one faster than said conveyor and the other slower than said conveyor to rotate the caps onto the threads of the containers, a pair of pressure belts mounted above said conveyor and positioned to engage other spaced portions of the caps on the containers, a drive means, means intercoupling said drive means and said pressure belts to permit compensating movement of one belt with respect to the other in accordance with the movement of the rotating caps, a pair of container supporting side belts positioned to engage opposite sides of containers on said conveyor, and a driving means moving each of said side belts at the speed of the conveyor.

8. A sealing machine for sealing containers with screw caps comprising the combination of a container supporting and moving conveyor, means to apply screw caps to the tops of containers being moved by said conveyor, a pair of driven cap rotating belts positioned above said conveyor to engage spaced portions of each cap on the moving containers, a pair of pressure belts engaging spaced top portions of each cap, a drive means, a coupling between said pressure belts and said drive means to permit the speed of one belt to be increased and the speed of the second belt to be decreased by their contact with the rotating cap, and a pressure shoe resiliently urging said pressure belts downwardly against the tops of the caps.

9. In a sealing machine the combination of means to rotate a closure cap, a pair of sealing pressure belts having their lower runs positioned to engage spaced top portions of a closure cap, and a coupling adapted to connect said pair of sealing pressure belts to a drive means to permit the pressure belts to move at different relative speeds as determined by the movement of the rotational cap.

10. In a sealing machine the combination of a pair of cap rotating belts having their lower runs positioned to engage spaced portions of a closure cap, driving means moving one of said belts at a higher speed than the other to rotate the cap onto a container, a pair of pressure belts mounted to engage other spaced portions of the cap top, and a coupling adapted to connect said pair of pressure belts to a drive means to cause the pressure belts to move at different relative speeds as determined by the rotation of the cap.

11. The sealing machine as claimed in claim 10 which further comprises a pressure shoe resiliently mounted against said pressure belts and urging said pressure belts toward the cap tops.

12. The sealing machine as claimed in claim 11 which further comprises a pair of container supporting side belts adjustably mounted to engage opposite sides of a container beneath said pressure belts, and a driving means moving each of said side belts at the same speed.

13. The method of turning a screw cap downwardly onto the threads of a container which comprises rotating the cap by engaging it at spaced points and moving the points in opposite directions, pressing the cap tops downwardly at two spaced portions, moving the pressed portions at different speeds, and continuously adjusting the speed of movement of the pressed portions in accordance with the rotational speed of the cap at the spaced portions.

14. The method of turning a screw cap onto the threads of a container comprising the steps of moving the cap threads downwardly against the container threads, pressing downwardly on spaced off-center portions of the cap causing the cap thread to slide downwardly along the container threads thereby rotating the cap, moving the pressed portions on a rotary path and continually adjusting the speed of movement of the pressed portions in accordance with the speed of the cap thereat.

15. A sealing machine for sealing containers with screw caps comprising the combination of a conveyor for moving threaded containers, a cap applying means to apply caps to said moving containers, a pair of cap rotating belts positioned to engage spaced portions of the caps on the containers, driving means for each of said cap rotating belts for driving one faster than said conveyor and the other slower than said conveyor to rotate the caps onto the threads of the containers, a plurality of pressure belts mounted above said conveyor and positioned to engage other spaced portions of the caps on the containers, and a coupling adapted to couple each of said pressure belts to a driving means to cause the speed of each of said pressure belts to be changed by the speed of rotation of the cap engaged thereby.

References Cited in the file of this patent
UNITED STATES PATENTS
2,876,605   McElroy et al. _____ Mar. 10, 1959